(12) United States Patent
Collard

(10) Patent No.: US 6,236,473 B1
(45) Date of Patent: May 22, 2001

(54) DIGITAL IMAGE REPRODUCTION APPARATUS WITH A VIRTUAL COPY SHEET RESERVOIR

(75) Inventor: Rene François A. Collard, Gennep (NL)

(73) Assignee: Oce-Technologies B.V., Venlo (NL)

( * ) Notice: Subject to any disclaimer, the term of this patent is extended or adjusted under 35 U.S.C. 154(b) by 0 days.

(21) Appl. No.: 09/092,095

(22) Filed: Jun. 5, 1998

(30) Foreign Application Priority Data

Jun. 6, 1997 (NL) .................................................. 1006250

(51) Int. Cl.[7] ...................................................... H04N 1/04
(52) U.S. Cl. ........................... 358/488; 358/401; 358/444
(58) Field of Search ..................................... 358/488, 498, 358/449, 444, 448, 451, 452, 296, 401; 399/374

(56) References Cited

U.S. PATENT DOCUMENTS

| | | | | |
|---|---|---|---|---|
| 5,239,388 | * | 8/1993 | Matsumoto | 358/448 |
| 5,301,036 | * | 4/1994 | Barrett | 358/448 |
| 5,528,361 | * | 6/1996 | Sakata | 358/296 |
| 5,600,429 | * | 2/1997 | Kutsuwada | 399/17 |

* cited by examiner

Primary Examiner—Cheukfan Lee

(57) ABSTRACT

A digital image reproduction device is provided with a platen for positioning on it a document for copying (it being possible to position the document both in a lengthwise and in a transverse orientation) and a scanner unit for scanning a document positioned on the platen. A printing unit (having at least one reservoir for copy sheets) is also provided for printing copies of scanned documents. The device is also provided with an operating panel for setting a required size and a required orientation of copies to be produced. Via the panel, a user is offered (for a copy size) a choice of all the orientations corresponding to the positioning orientations available on the platen (or a document feeder, if one is provided), including at least one orientation for which no stock of copy sheets having the same orientation is available in the printing unit. In the event that an operator sets an orientation for which no stock of copy sheets has the same physical orientation, the image data are automatically rotated to the orientation for which there is a stock of copy sheets available in the printing unit and then the image data are printed on copy sheets from that stock.

13 Claims, 6 Drawing Sheets

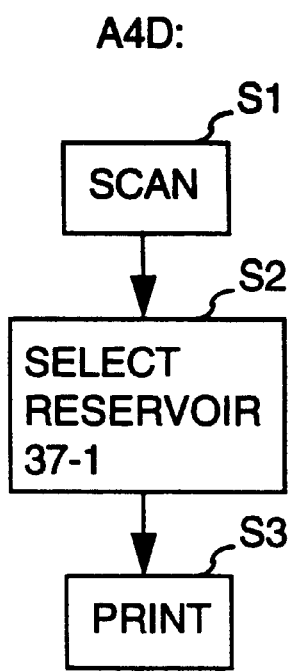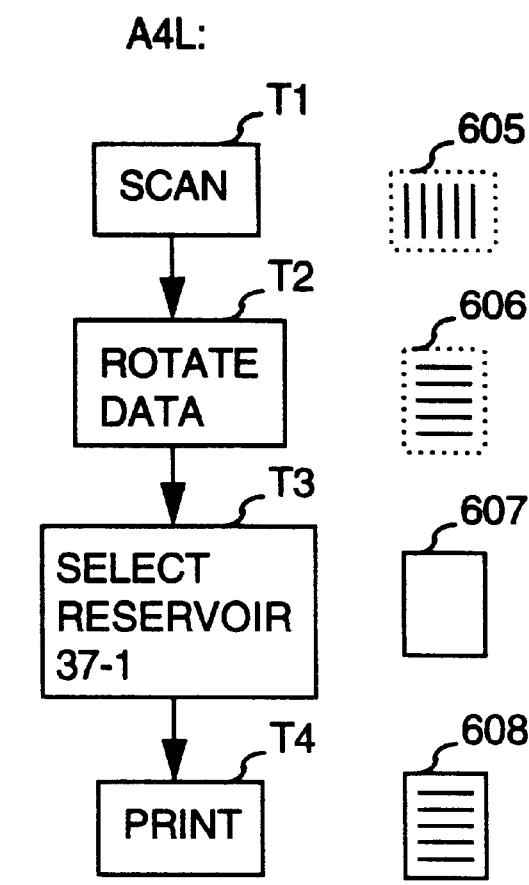
FIG. 6A
FIG. 6B

DIGITAL IMAGE REPRODUCTION APPARATUS WITH A VIRTUAL COPY SHEET RESERVOIR

FIELD OF THE INVENTION

The invention relates to a digital image reproduction apparatus, and more particularly to such an apparatus having an interface for providing a user with choices of orientations of original documents.

BACKGROUND OF THE INVENTION

In a digital image reproduction apparatus of this kind, a digital image data file is first made by the scanner from a document for copying and these image data are used to control the printing unit. By processing the image data in the meantime it is possible to change them and thus offer functionality which was not possible in optical copying machines, which are frequently referred to as "analogue" machines.

Such processing is, for example, rotation through an angle of 90°, so that, for example, a document placed transversely on the positioning section (generally a glass platen or a document feeder) can be printed on an image support (usually a sheet of paper) oriented in the lengthwise direction, i.e. rotated through 90°.

In U.S. Pat. No. 5,239,388 (the '388 patent), use is made of the above rotation functionality by arranging for the scanner to determine the orientation of the original in a pre-scan, comparing the pre-scanned orientation with the orientation of the copy paper in the reservoir, and (in the event of non-agreement) automatically (and unavoidably) rotating the image data through 90°, so that the reproduced image nevertheless fits the copy paper. The '388 patent second-guesses the instruction of the user to surmise the user's intent based upon an assumption that a user always desires to copy onto a similarly oriented copy support. As a result, copying of 100% of the original document is carried out even if there is no copy paper present having the same orientation as the original document.

However, such automation sometimes leads to unwanted situations because the user might have specifically wanted to copy onto copy paper of a different orientation. Consider the following scenario. As digital image reproduction apparatuses become more sophisticated, so do their operating systems and user-interfaces. There might be an instance in which a hurried user desires to make a partial copy, i.e. to mask (or not reproduce) a portion of an original document but does not have the time and/or the inclination to learn the most appropriate procedure to accomplish his objective. Such a user might solve his dilemma by using a "quick and dirty" solution of copying a lengthwise-oriented document onto a transversely-oriented image support, i.e. an intentional mismatch. In that case, the automatic behaviour of the prior art machine will surprise the user and even make his intentions impossible.

Because of his experience with analogue copying machines, a user will generally expect the orientation of the produced copy to be the same as that of the original document and on that basis he will choose a specific orientation when applying the document to the positioning section. In the example scenario discussed above, the prior art machine will thwart and frustrate an untrained user who is in a hurry and/or is disinclined to be trained to the most appropriate use of the machine's complicated operating system.

SUMMARY OF THE INVENTION

The object of this invention is to provide a reproduction apparatus which can be operated in a simple manner both comprehensible and predictable to the user, wherein (by digital functionality) it is possible to make copies of original documents in more or other orientations than might be expected on the basis of the physical orientations of the stocks of copy supports (e.g., paper) present in the printing unit.

To this end, according to the invention, the operating unit is adapted to offer for a copy format a choice of all the orientations corresponding to the positioning orientations available on the glass platen or via the document feeder, including at least one orientation for which there is no physically corresponding orientation of image support stock available in the printing unit. The control unit, in the event that the unavailable orientation is chosen (or set) by the user, selects a reservoir, which contains image supports of the required format albeit at other than the required orientation, and also causes rotation of the image data by the rotation module through an angle corresponding to the difference between the required and the said other orientation.

According to the invention, a choice of two orientations is always offered to the user via the operating interface, one which is the same as a physical orientation of a stock of copy paper present in the apparatus and one which has orientation as a stock which in actual fact is non-existent, hence a virtual stock. In the case of the latter orientation, the image data are rotated and printed on the copy paper that is available. The operator does not know this, nor does he need to. He can choose whatever he wishes and is not surprised by unexpected (and possibly unwanted) automation.

In specific cases, as a result of technical limitations it may happen that a specific format of original documents can only be applied to the positioning section in a single orientation, while sometimes also a specific format of copy paper can only be processed by the printer unit in a single orientation. When the orientations of the original document (as imposed by the positioning section) and the copy are different, the control unit will automatically cause the image data to be rotated so that they can nevertheless be printed. However, the only orientation offered on the operating means is the one corresponding to the orientation imposed by the positioning section on the original document.

For example, where the apparatus is provided with an automatic document feeder which positions documents on the positioning section in the same orientation as that in which they are offered to the document feeder, only an orientation imposed by the document feeder is offered to the user.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DRAWINGS

The present invention will become more fully understood from the detailed description given hereinbelow and the accompanying drawings which are given by way of illustration only, and thus are not limitative of the present invention and wherein:

FIGS. 6A and 6B are each a flow diagram of a control program according to the invention.

DETAILED DESCRIPTION OF THE PREFERRED EMBODIMENTS

Figure 1:
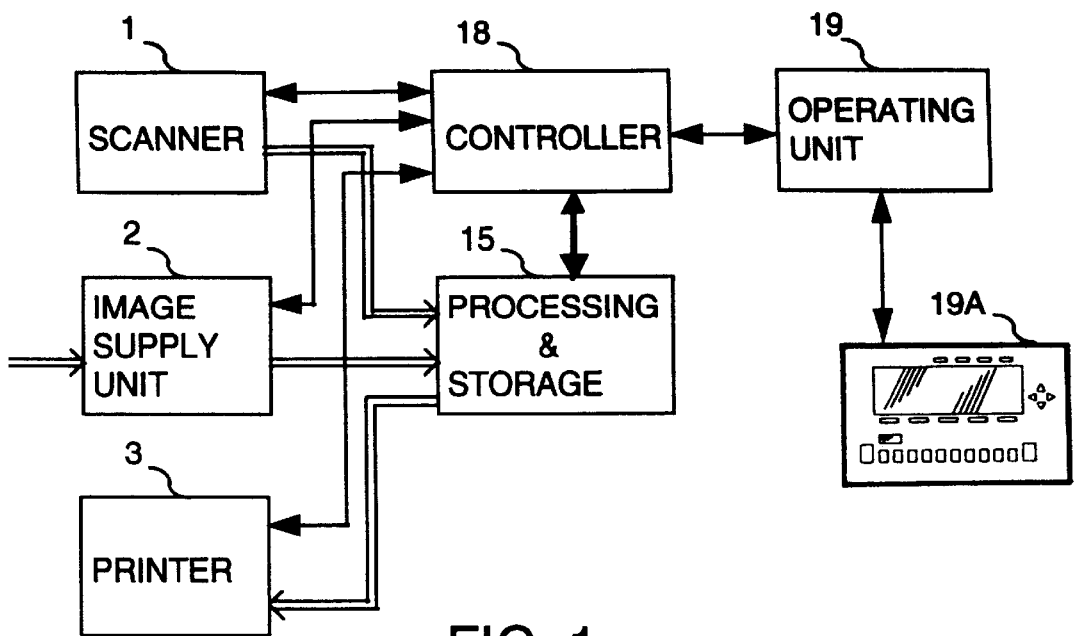
FIG. 1 is a general lay-out of the reproduction apparatus according to the invention.

FIG. 1 shows the general layout of an image reproduction apparatus according to the invention. This apparatus comprises a scanner 1 for opto-electrical scanning of a document and yielding digital image information corresponding thereto, an input unit 2 for image information from an external source, and a printing unit (e.g., a printer) 3 for printing digital image information on a support material.

Both the scanner 1 and the input unit 2 are connected to a device 15 for processing and intermediate storage of image information, which is in turn connected to the printing unit 3. The scanner 1, input unit 2, device 15 and printing unit 3 are connected to a central control unit 18, which is also connected to an operating unit (or interface) 19 provided with an operating panel 19A with operating elements and a display screen for use by an operator.

Figure 2:
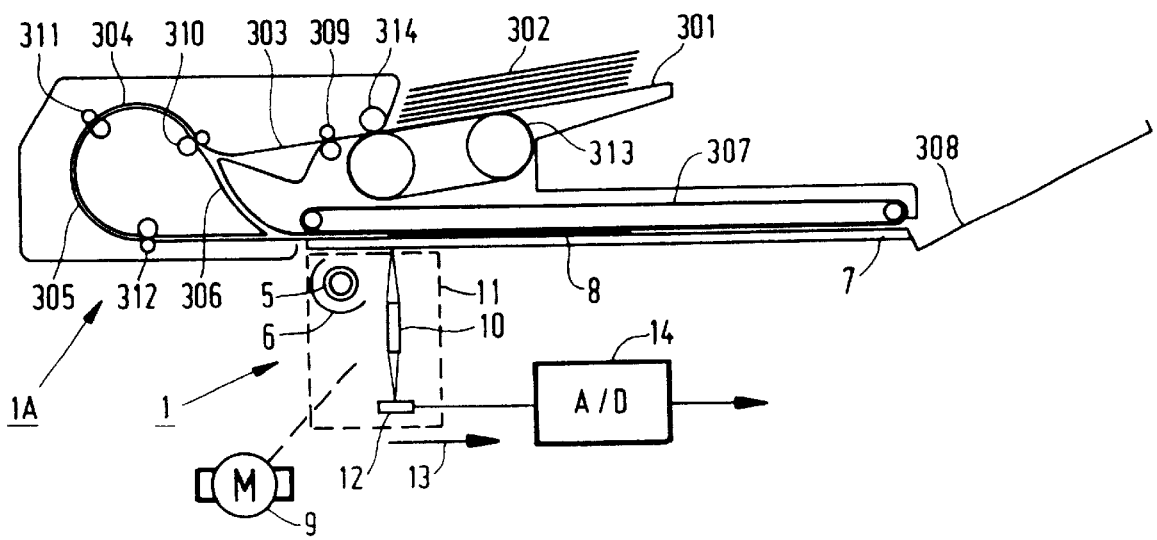
FIG. 2 shows a scanner device with a document feeder.

The scanner device 1 is shown in greater detail in FIG. 2. It is provided with a tubular lamp 5 and a reflector 6 co-operating therewith, by which a narrow strip of a document 8 placed on a glass platen 7 is illuminated. The scanner also comprises an array 10 of imaging glass fibres (a "selfoc lens array"), by which the light reflected by the document is projected on to a sensor array, e.g. a CCD array 12. The lamp 5, reflector 6, selfoc lens array 10 and CCD array 12 are combined on a carriage 11 which during scanning is advanced by a servomotor 9 at a uniform speed in the direction of the arrow 13, so that the document 8 is scanned line-by-line by the CCD array 12. The position of the carriage 11 is continuously measured using a known technique and used inter alia for the feedback circuit of the servomotor 9.

In this way each image dot of the document is converted to an analogue signal corresponding to the grey value of that image dot. The analogue signal is then converted by an A/D converter 14 to a digital signal for each image dot.

The scanner 1 is equipped with an automatic document feeder (ADF) 1A. This comprises a feed tray 301 for the insertion of a stack of documents 302 for copying, a separating mechanism 313, 314 for removing the documents from the bottom of the stack one by one, and a transport mechanism, containing the transport paths 303, 304, 305, 306 and the transport roller pairs 309, 310, 311, 312 for transporting a separated document to the platen 7. The document 8 is transported over the platen 7 by a conveyor belt 307, which transports it to the delivery tray 308 after scanning by the scanner carriage 11.

Figure 3:
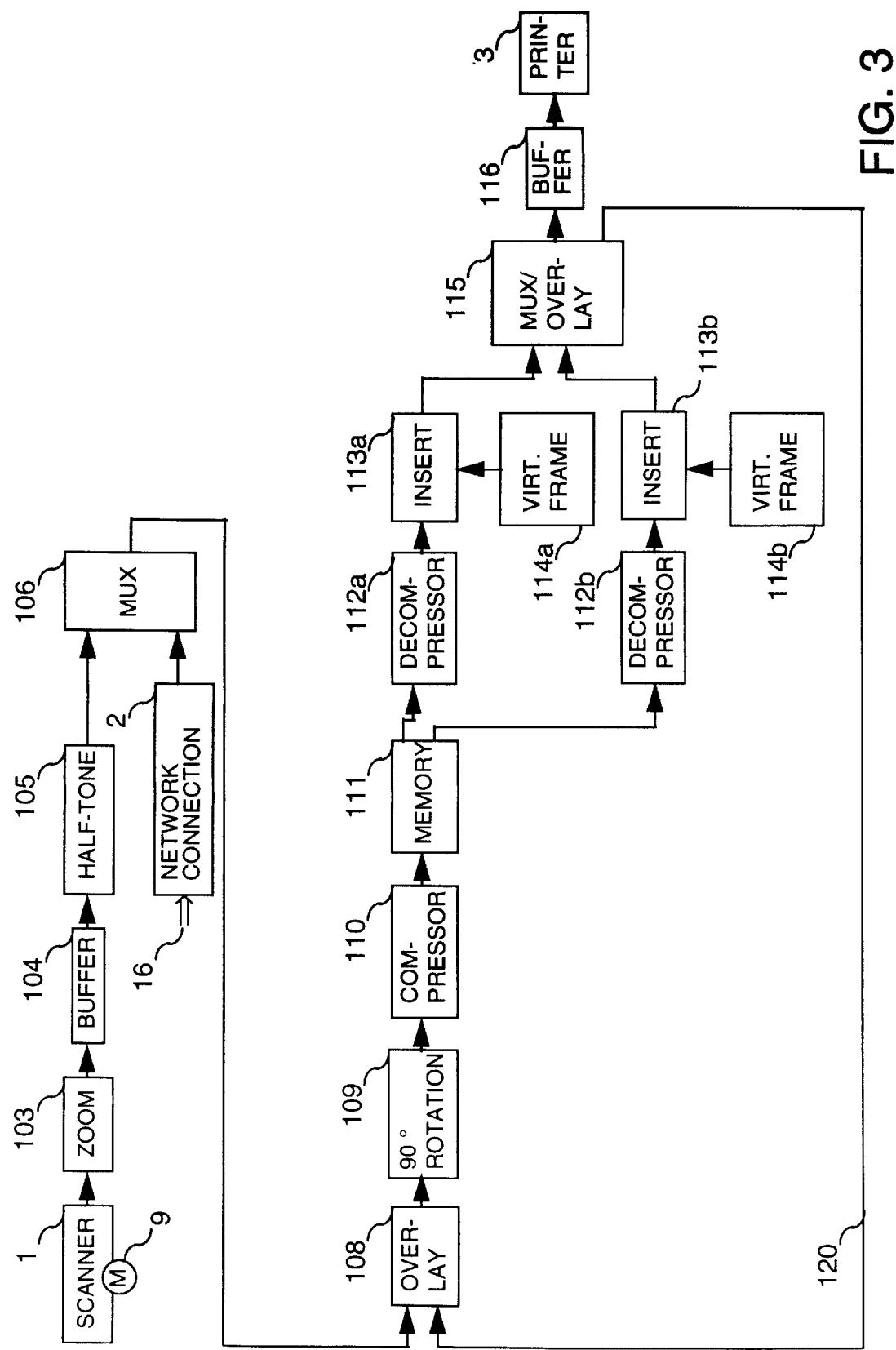
FIG. 3 is a diagrammatic view of the processing device for digital image data.

FIG. 3 is a diagram showing the construction of a device 15 for processing and intermediate storage of image information, in which the rectangles represent functional modules (both physical components and software modules) and the arrows indicate the data flow from one module to the next. The scanner 1, input unit 2 and printing unit 3 are included in this drawing in order to show their position relative to the device 15. Although not shown in the drawing, the various elements of the device 15 are connected to the control unit 18, which coordinates their action.

The digital signals from the scanner 1 are fed to a ZOOM module 103 which, if required, carries out enlargement or reduction via interpolation.

The signals from the ZOOM module 103 are fed via a buffer 104 to a half-tone module 105, which converts the signals, which then still describe grey values, into binary signals which specify one of two values: zero or one for each pixel, so that these signals are suitable for controlling a printing unit which can print only black or white image dots. The literature describes many half-tone processes, so that no explanation is required. It is immaterial to this description what half-tone process is applied provided that the resulting signals are binary.

The signals from the half-tone module 105 are in turn transmitted to a multiplexer 106. An input unit (or network connection) 2 for digital image signals from a local network 16 is connected to another input of multiplexer 106, so that digital signals from an external source, such as a work station, can be inputted. The input unit comprises a PDL interpreter which converts the received—coded—digital image signals into binary signals suitable for controlling the printing unit.

The multiplexer 106 transmits one of two data streams (from the scanner or the network) to a mixer (or overlay) module 108. The latter has a second input to which a return (or feedback) line 120 is connected to return (or to feedback) signals from the memory 111, and this will be explained hereinafter.

In the mixer module 108 the signals from multiplexer 106 and return line 120 can be mixed in accordance with logic functions on a pixel basis corresponding to the mixing of two images. Examples of such logic functions are: OR, AND, EXOR. Mixing binary image signals in this way is known generally from the literature and requires no further explanation here.

The mixer module 108 is connected to a rotation module 109, in which the image defined by the signals from the mixer module 108 can be rotated through an angle of 0, 90, 180 or 270 degrees.

The signals from rotation module 109 are then compressed in a compression module 110 and stored in a memory 111. Although compression is not strictly necessary, it is advisable, because it is possible in this way to store the data of more documents. The compression method can, for example, be run length coding. The memory 111 is provided with a management system (not shown), which updates the addresses at which the data of the documents are stored.

The memory 111 is constructed with two independent read-out lines, so that the image data of two documents can be read out simultaneously. These read-out lines are each connected to a decompression module (112a, 112b). These are connected to processing circuits which are identical in principle and are formed by insert modules 113a, 113b. These modules can combine the image signals with artificial image data, e.g., corresponding to a blank (white) image, and which are delivered by a virtual frame module 114a, 114b also connected to insert module 113a, 113b. The purpose of this is to be able to make image data which describe a larger image than the image data from the memory 111, e.g. an image of which the right-hand half consists of a scanned document and the left-hand half is blank (white).

The insert modules 113a, 113b are connected to a mixer multiplexer 115, in which one of the image signals can be selectively passed or both image signals can be mixed in the same way as described for mixer module 108.

Mixer multiplexer 115 has two outputs. One is the return line 120 already referred to, which enables images stored in the memory to be rotated and also mixed with freshly supplied (scanned) images. The other output is connected via a buffer 116 to the printing unit 3, which will be discussed in greater detail hereinafter.

Buffers can be provided at various places in the circuit described. However, since they are of lesser significance to the principle of operation, they have not been described in detail.

For the description of the printing device 3 reference will be made to FIG. 4. This printing device is provided with an endless photoconductive belt 20, which is advanced in the direction of arrow 24 at a uniform speed by driving and guide rollers 21, 22 and 23 respectively.

By way of the processed image data supplied by device 15, an LED array 25 is so controlled that the photoconductive belt 20, after being electrostatically charged by a corona device 30, is exposed line-by-line image-wise.

The latent charge image forming on the belt 20 by the exposure is developed with toner powder by a magnetic brush device 30 to form a toner image which in a first transfer zone is then brought into contact under pressure with an endless intermediate medium belt 32 made from or covered with an elastic and heat-resistant material, such as silicone rubber for example. In these conditions, the toner image is transferred by adhesion forces from the belt 20 to the belt 32. After this image transfer, any remaining toner powder residues are removed from the photoconductive belt 20 by a cleaning device 33, after which said belt 20 is ready for fresh use.

The intermediate medium belt 32 is trained over drive and guide rollers 34, 35, the intermediate medium belt 32 being heated to a temperature above the softening temperature of the toner powder, e.g. by an infrared radiator disposed inside roller 35. While the belt 32 with the toner image thereon is advanced, the toner image becomes sticky as a result of the heating.

In a second transfer zone between the belt 32 and a pressure roller 36, the sticky toner image is transferred by pressure and simultaneously fixed on a copy sheet which is supplied from one of the reservoirs 37-1, 37-2 or 37-3.

The copy obtained in this way can finally be deposited in a delivery tray 39 or be fed to an inverting device 41 by a deflector element 40 (placed in the broken-line position shown). The copy sheet is turned over in this inverting device 41 and is then again fed to the second transfer zone between the belt 32 and the pressure roller 36 for printing with a powder image on the other side in said transfer zone, and is then deposited in the delivery tray 39.

Figure 4:
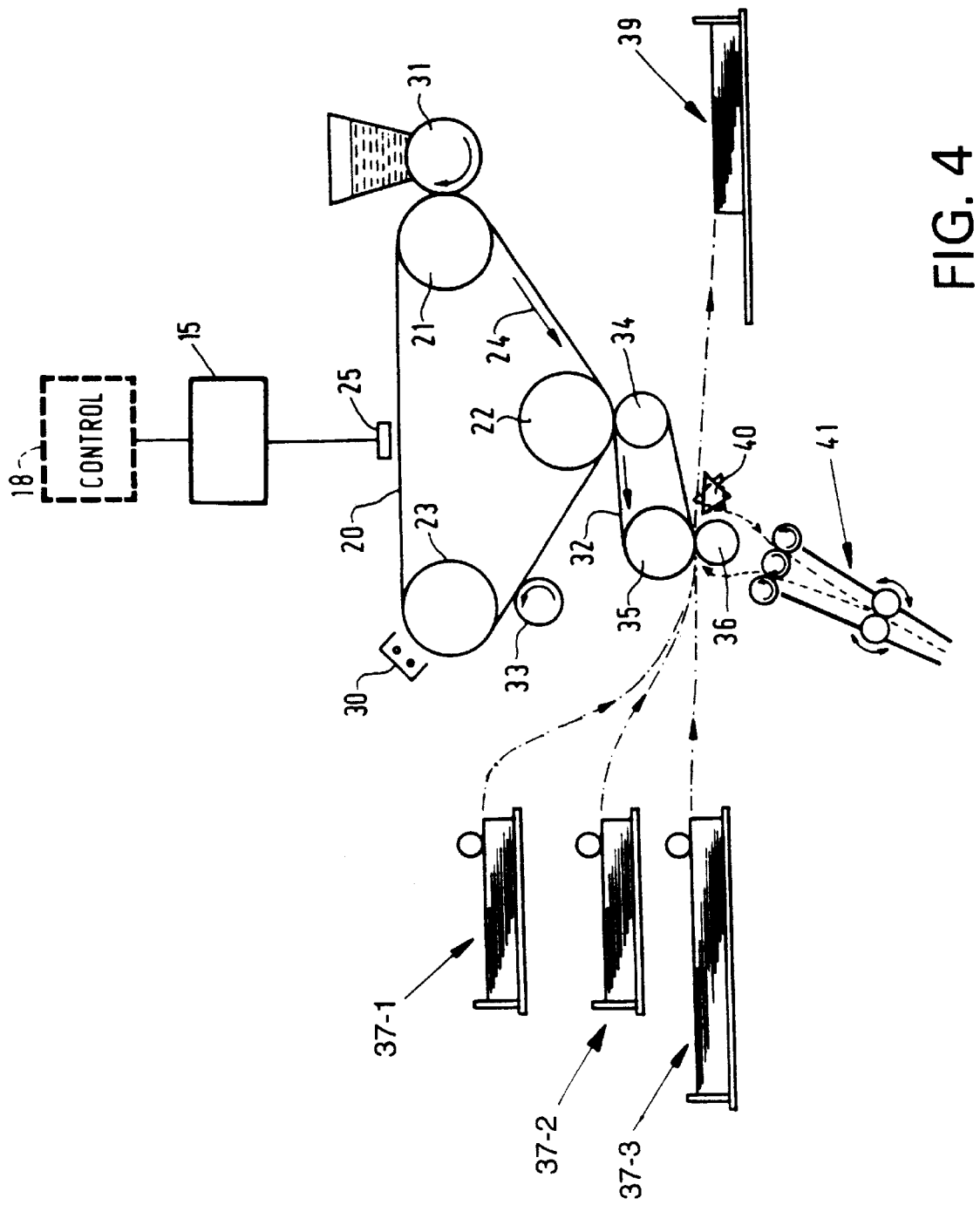
FIG. 4 is a printing device.

FIG. 4 shows three copy sheet reservoirs 37-1, 37-2 and 37-3, the first two being arranged for copy sheets of the A4 size and the last for copy sheets of the A3 size. Reservoir 37-1 is the standard or default reservoir, from which copy sheets are supplied unless another reservoir is selected by an operator. Reservoir 37-2 is arranged for copy sheets of the same format as 37-1, and is intended for a different kind of copy sheet, e.g. a different colour or a different gram weight.

Of course, the number of reservoirs may also differ from three, and reservoirs can be used for different formats or orientations of copy sheets.

Figure 5:
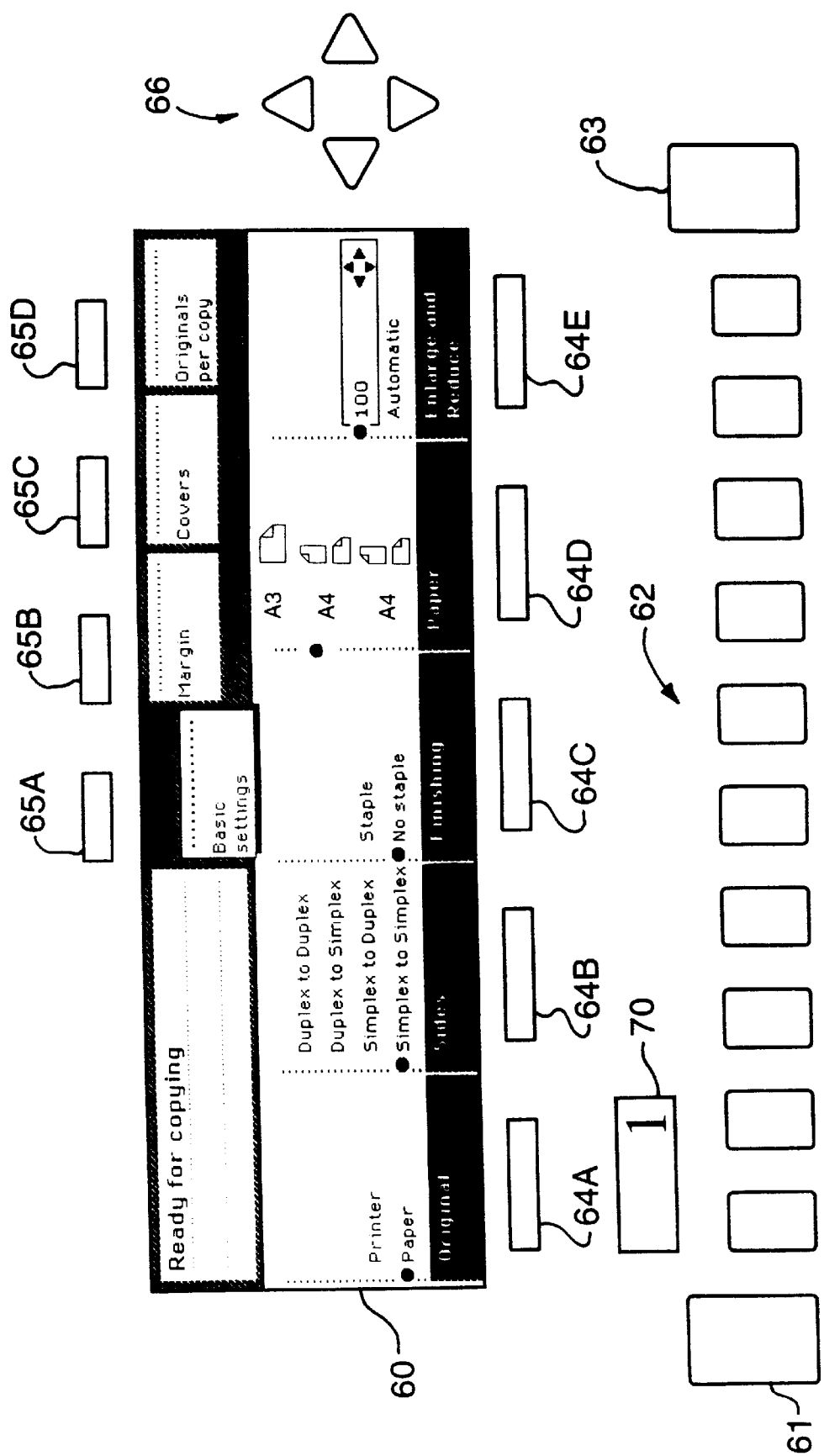
FIG. 5 is an illustration of an operating panel.

The different parts of the printing device 3 are controlled by the central control unit 18 directly or through the agency of sub-control modules. The operating panel 19A belonging to the operating unit 19 is shown in FIG. 5 and comprises a display screen 60, such as an LCD display, and a number of keys, namely a start key 61, number keys 62, correction key 63 and selection keys 64A–E, 65A–D and the key cluster 66. All these elements are connected to the operating unit 19, which in response to operation of the keys passes signals to the control unit 18 and which also controls the display screen 60 for the purpose of showing selection options and messages to the operator.

When the apparatus is switched on, the display screen 60 displays a picture formed by a number of vertical columns each situated above one of the selection keys 64A–E. Each column relates to a specific basic function of the apparatus and displays the various possible settings of that basic function. For example, the column on the extreme left is allocated to the choice between the copying function in which a document is scanned by the scanner and then reproduced, and the printer function, in which a print is made in accordance with digital image data supplied via the network connection. The currently selected setting, in this case the copying function, is displayed by a marker, such as a dark dot, or by highlighting. An operator can choose a different setting, e.g. in accordance with a cyclic program, by pressing a selection key.

The columns above the keys 64A (already mentioned), 64B (simplex or duplex, both in respect of the original document and the copy sheet), 64C (stapling) and 64D (the choice of the size of the printing paper) relate to the processing of the order. The column above key 64E relates to enlargement. This can be set automatically (by reference to the ratio between the original document and the selected copy format) or manually, by way of the key cluster 66.

The selection keys 65A–D offer the possibility of calling up a different set of functions (group) which cannot be displayed because of the restricted dimensions of the display screen 60. Generally, these functions are those which are not required for a simple copying or printing order, but which offer the operator more options for obtaining special printing results. In this example, these functions comprise shifting the margin on the print, adding covers, and multiple up. The meaning of the keys 65A–D is displayed in an associated field on the display screen 60, directly beneath each key. When one of the keys is pressed, the corresponding set of functions is rendered operative and the layout of the display screen 60 is adapted to the relevant functions. At the same time, this selection is displayed by framing or otherwise emphasising the field on the display screen 60 belonging to the actuated key of the group 65A–D.

The operating panel 19A also contains a number display 70, for displaying the number of prints set, as is generally customary on copying machines.

The column above key 64D on the operating panel 19A (of FIG. 5) contains a list of the selectable formats and orientations of copy paper. In this example, from bottom to top this is: a first A4 lengthwise and A4 transverse (this relates for example to normal white paper), a second A4 lengthwise and A4 transverse (this relates for example to coloured thicker paper for covers) and A3 lengthwise. The terms "lengthwise" and "transverse" are defined in relation to the direction of transport in the apparatus (this is the left to right direction to an operator at the machine). More specifically, "transverse" means that the long side of the document is situated transversely in relation to the direction of transport, and "lengthwise" means that the long side is parallel to the direction of transport.

Copy paper in accordance with the selection "A4 lengthwise" is, however, not actually present in the apparatus, as will be apparent from the description of the printing device, FIG. 4. The reservoirs 37-1, 37-2 and 37-3, in fact, contain respectively A4 transverse, A4 transverse and A3 lengthwise.

If an operator now selects "A4 lengthwise", the control unit 18 nevertheless internally selects the reservoir 37-1, or 37-2, and switches the rotation unit 109 (FIG. 2) into the mode in which the image data are turned through 90° in the clockwise or counter-clockwise direction depending on the technical layout of the apparatus. The copies are then made correctly, but are delivered only in the transverse orientation. This is not inconvenient to the operator, because the selection "A4 lengthwise" is only relevant in relation to the orientation of the original document and this relation is maintained.

The control program operative in the control unit 18 is shown in FIGS. 6A and 6B.

FIG. 6A shows the procedure when the selection "A4 transverse" is selected on the operating panel (for the A4 choice at the bottom of the column on the display screen). In this case the program runs in accordance with the steps S1: scan the original (a "transversely" situated digital image 601 is generated); S2: select copy sheet reservoir 37-1 (a "transversely" situated copy sheet 602 is selected); S3: print the image data on a copy sheet from reservoir 37-1 (a "transversely" situated copy 603 is printed).

FIG. 6B shows the procedure when the selection "A4 lengthwise" is made on the operating panel and the program takes place in accordance with the steps T1: scan the original (a "lengthwise" situated digital image 605 is generated); T2: rotate the image data (the digital image 605 is rotated into a "transverse" digital image 606); T3: select copy sheet reservoir 37-1 (a "transversely" situated copy sheet 607 is selected); T4: print the image data on a copy sheet from reservoir 37-1 (a "transversely" situated copy 608 is printed).

An identical program applies to the top A4 choice in the column on the display screen, but of course the reference to reservoir 37-1 is replaced by reference to reservoir 37-2, in which other copy sheets of format A4 are situated, e.g. thicker coloured paper for covers. The addition of covers can be set for a copy order with the aid of the operating interface 19. These covers are then taken from reservoir 37-2 and printed with the scanned images of corresponding original documents. Of course these covers should receive the same treatment in respect of rotation as normal copy sheets. Copy sheets from reservoir 37-2 can also be used as copy sheets for a complete copy order which has to be printed, for example, on sheets of another colour. In such a case, of course, it is desirable to offer the same functionality for these copy sheets as for the normal copy sheets in tray 37-1.

In another embodiment, the reservoir 37-3 is filled with copy paper of the A5 size. As an example it will now be assumed that because of technical limitations the automatic document feeder 1A can feed an A5 document only "transversely", while the printing device 3 can only pass an A5 document "lengthwise". Thus the orientation is obligatorily "transverse" for the document feeder 1A. In the case of an A5 original and copy size, the control unit 18 automatically switches the rotation unit 109 into the mode in which the image data 90 are turned through 90°.

Figure 7:
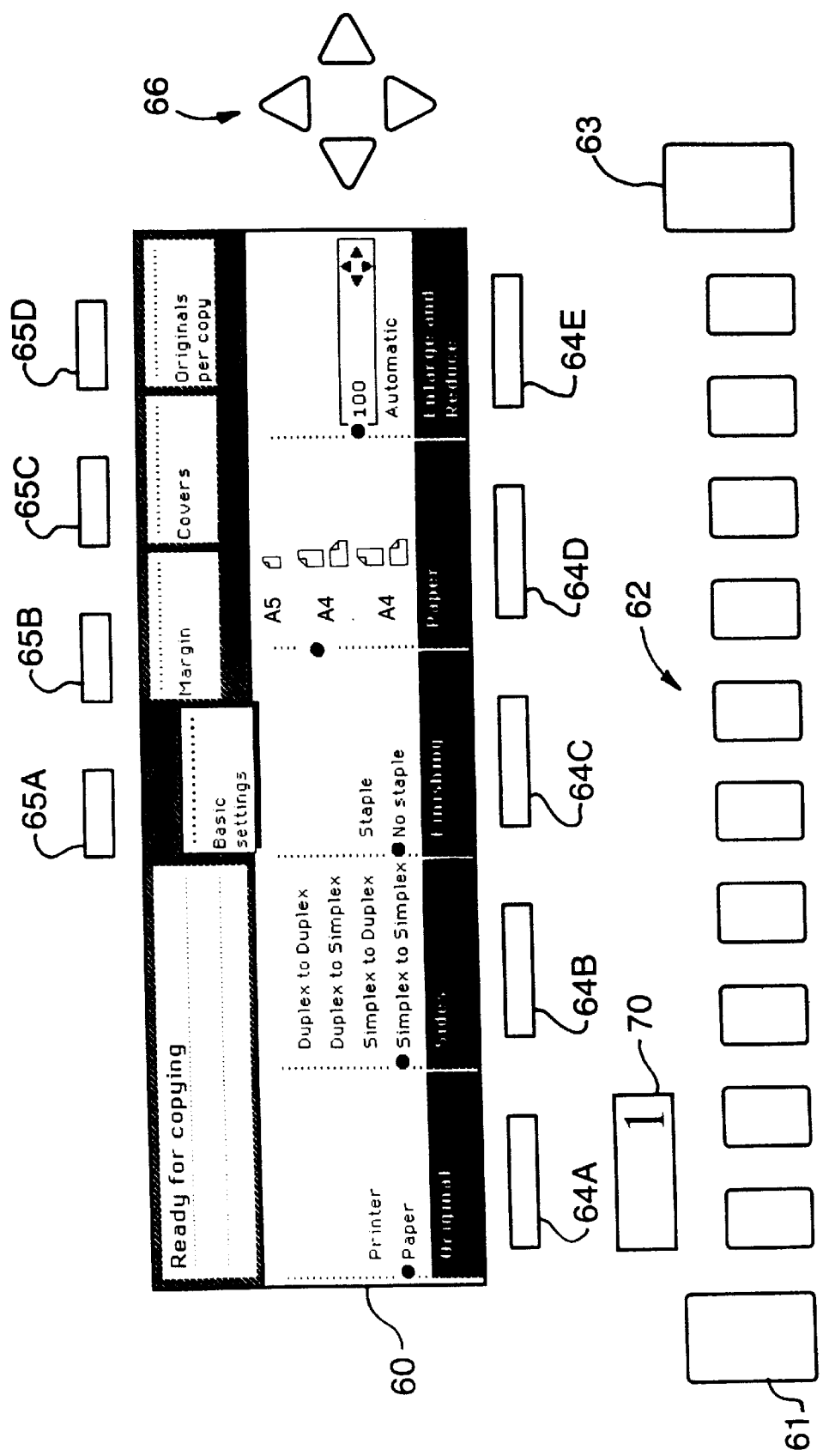
FIG. 7 is also an illustration of an operating panel.

FIG. 7 shows the operating panel belonging to this embodiment. The column above key 64D now shows in addition to the two A4 choices in two orientations an A5 transverse option, although in actual fact A5 lengthwise is the only available copy orientation. However, this presentation is more comprehensible to the user, because it corresponds to the (obligatory) orientation of the original document. If the option for the copy orientation "A5 lengthwise" offered were to correspond to the paper stock in reservoir 37-3, the user would be confused because he would think that he must still set an image rotation. This is now done automatically by the control unit 18. The associated control program is exactly the same as that shown in FIG. 6B, although now reservoir 37-3 is selected.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital image reproduction apparatus comprising: a positioning section for positioning thereon a document to be copied;

a scanner unit for scanning a document positioned on the positioning section such that digital image data is generated;

a processing unit for processing image data generated by the scanner unit, said processing unit being provided with a rotation module for selectively rotating the image data through an angle;

a printing unit for printing a digital image on an image support, the printing unit being provided with at least one reservoir for image supports;

an operating interface provided with an operating panel for setting a required size and a required orientation of image supports for copies to be produced;

said operating interface offering a plurality of selectable image support orientation options, including at least one selectable orientation that is different from any physical orientation of image supports in any of said at least one reservoir, so as to effect a virtual copy sheet reservoir;

a control unit connected to said units for controlling said scanner unit, said processing unit and said printing unit, said control unit accepting, via said operating interface, a selection of a first image support orientation that is different from any physical orientation of image supports in any of said at least one reservoir;

said control unit selecting a reservoir in said printing unit for delivering image supports and controlling said processing unit to rotate said image data to compensate for a difference between the first image support orientation and the physical orientation of image supports in the reservoir selected by the control unit.

2. An apparatus according to claim 1, wherein the positioning section is provided with an automatic document feeder which positions documents on the positioning section in a positioning orientation corresponding to the orientation in which they are supplied to the document feeder.

3. An apparatus according to claim 1 wherein there are two selectable image support orientations.

4. An apparatus according to claim 3, wherein a first one of said selectable image support orientations is oriented perpendicularly to a second one of said selectable image support orientations.

5. An apparatus according to claim 1, wherein documents for copying are positioned on the positioning section in one of a plurality of positioning orientations, and said operating interface offers, for any copy size, as many selectable image support orientations as there are positioning orientations.

6. A digital image reproduction apparatus comprising:

a positioning section for positioning thereon a document, for copying, in a first or second orientation;

a scanner unit for scanning a document positioned on the positioning section such that digital image data is generated;

a processing unit for processing image data generated by the scanner unit, said processing unit being provided with a rotation module for selectively rotating the image data through an angle;

a printing unit for printing a digital image on an image support, the printing unit being provided with a reservoir for image supports having a physical orientation that is the same as said first orientation but different than said second orientation;

an operating interface provided with an operating panel for setting a required size and a required orientation of image supports for copies to be produced, the operating interface offering a first option and a second option for image support orientation, respectively, corresponding to said first and second orientations, respectively, so as to effect a virtual copy sheet reservoir via said second option; and a control unit connected to the said units for controlling the scanner unit, said processing unit and the printing unit such that, if a user selects said second option, the control unit is operable to control said rotation module to compensate for a difference in orientation between said second positioning orientation on said positioning section and said physical orientation of said image supports in said reservoir.

7. An apparatus according to claim 6, wherein the positioning section is provided with an automatic document feeder which positions documents on the positioning section in the s ame orientation as that in which they are offered to the document feeder.

8. An apparatus according to claim 6, wherein said first positioning orientation is oriented perpendicularly to said second positioning orientation.

9. An apparatus according to claim 6, wherein said reservoir is a first reservoir and said printing unit includes a second reservoir for image supports, and said operating interface is operable to provide, as said copy format, a third and a fourth option that relate said first and second positioning orientations, respectively, to a physical orientation of image supports in said second reservoir.

10. A digital image reproduction apparatus comprising:

a positioning section for positioning thereon a document for copying such that, for a first document size, said positioning section can accommodate only a first positioning orientation;

a scanner unit for scanning a document positioned on the positioning section such that digital image data is generated;

a processing unit for processing image data generated by the scanner unit, said processing unit being provided with a rotation module for selectively rotating the image data through an angle;

a printing unit for printing a digital image on an image support, said printing unit being provided with only one reservoir for image supports of a second document size, stored in a second physical orientation different from said first positioning orientation;

an operating unit provided with an operating panel for setting a required size and a required orientation of image supports to be used for producing copies, said operating unit offering, for said second document size, only an image support orientation that is the same as said first positioning orientation;

a control unit connected to said units for controlling said scanner unit, said processing unit and said printing unit, such that, if a user selects said second size, the control unit controls said processing unit to rotate said image data to compensate for the difference between said first positioning orientation and said physical orientation of image supports in the reservoir.

11. An apparatus according to claim 10, wherein the positioning section is provided with an automatic document feeder which positions documents on the positioning section in the same orientation as that in which they are offered to the document feeder.

12. An apparatus according to claim 10, wherein said first positioning orientation is oriented perpendicularly to said second physical orientation.

13. An apparatus according to claim 10, wherein said printing unit includes a third reservoir for image supports, and said operating interface is operable to provide, as said copy format, a fourth and fifth option corresponding to said first and second positioning orientations, respectively, applied to image supports in said third reservoir.

* * * * *